United States Patent
Araujo Da Silva et al.

(10) Patent No.: US 12,371,523 B2
(45) Date of Patent: Jul. 29, 2025

(54) RUBBER COMPOSITION

(71) Applicant: COMPAGNIE GENERALE DES ETABLISSEMENTS MICHELIN, Clermont-Ferrand (FR)

(72) Inventors: Jose-Carlos Araujo Da Silva, Clermont-Ferrand (FR); Frederic Lemerle, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 628 days.

(21) Appl. No.: 17/786,348

(22) PCT Filed: Dec. 9, 2020

(86) PCT No.: PCT/FR2020/052354
§ 371 (c)(1),
(2) Date: Jun. 16, 2022

(87) PCT Pub. No.: WO2021/123568
PCT Pub. Date: Jun. 24, 2021

(65) Prior Publication Data
US 2023/0059504 A1  Feb. 23, 2023

(30) Foreign Application Priority Data
Dec. 17, 2019  (FR) ...................... 1914615

(51) Int. Cl.
C08F 236/08 (2006.01)
B60C 1/00 (2006.01)
C08F 210/02 (2006.01)
C08K 3/04 (2006.01)

(52) U.S. Cl.
CPC .......... C08F 236/08 (2013.01); B60C 1/0025 (2013.01); C08F 210/02 (2013.01); C08K 3/04 (2013.01); *C08F 2500/27* (2021.01); *C08F 2500/32* (2021.01)

(58) Field of Classification Search
CPC ........ C08F 236/08; C08F 210/02; C08K 3/04; B60C 1/00
USPC ...................................... 523/156
See application file for complete search history.

(56) References Cited

U.S. PATENT DOCUMENTS

| | | |
|---|---|---|
| 5,227,425 A | 7/1993 | Rauline |
| 5,852,099 A | 12/1998 | Vanel |
| 5,900,449 A | 5/1999 | Custodero et al. |
| 6,420,488 B1 | 7/2002 | Penot |
| 6,536,492 B2 | 3/2003 | Vasseur |
| 7,250,463 B2 | 7/2007 | Purel et al. |
| 8,071,700 B2 | 12/2011 | Thuilliez et al. |
| 8,071,800 B2 | 12/2011 | Thuilliez et al. |
| 8,268,949 B2 | 9/2012 | Thuilliez et al. |
| 8,492,573 B2 | 7/2013 | Thuilliez et al. |
| 9,212,274 B2 | 12/2015 | Matsushita et al. |
| 10,752,712 B2 | 8/2020 | Afaquiere et al. |
| 10,934,377 B2 | 3/2021 | Lafaquiere et al. |
| 11,241,370 B2 | 2/2022 | Valero et al. |
| 2001/0034389 A1 | 10/2001 | Vasseur |
| 2005/0004297 A1 | 1/2005 | Durel et al. |
| 2005/0032965 A1 | 2/2005 | Valero |
| 2009/0182104 A1 | 7/2009 | Thuilliez et al. |
| 2010/0022725 A1 | 1/2010 | Thuilliez et al. |
| 2010/0221541 A1 | 9/2010 | Valero et al. |
| 2011/0263784 A1 | 10/2011 | Valero et al. |
| 2012/0142905 A1 | 6/2012 | Thuilliez et al. |
| 2012/0165492 A1 | 6/2012 | Thuilliez et al. |
| 2013/0324660 A1 | 12/2013 | Matsushita et al. |
| 2017/0291454 A1 | 10/2017 | Araujo Da Silva et al. |
| 2017/0327617 A1 | 11/2017 | Araujo Da Silva et al. |
| 2018/0355083 A1 | 12/2018 | Lafaquiere et al. |
| 2019/0263954 A1 | 8/2019 | Lafaquiere et al. |
| 2021/0054118 A1 | 2/2021 | Lafaquiere et al. |
| 2022/0072903 A1 | 3/2022 | Merino Lopez et al. |
| 2022/0073713 A1 | 3/2022 | Merino Lopez et al. |
| 2022/0379586 A1 | 12/2022 | Araujo Da Silva et al. |

FOREIGN PATENT DOCUMENTS

| | | | |
|---|---|---|---|
| EP | 0039240 A1 | * | 11/1981 |
| EP | 0501227 A1 | | 9/1992 |
| EP | 0735088 A1 | | 10/1996 |
| EP | 0810258 A1 | | 12/1997 |
| EP | 2682423 A1 | | 1/2014 |
| FR | 3078973 A1 | | 9/2019 |
| WO | 97/36724 A2 | | 10/1997 |
| WO | 99/16600 A1 | | 4/1999 |
| WO | 00/05300 A1 | | 2/2000 |
| WO | 00/05301 A1 | | 2/2000 |
| WO | 03/016215 A1 | | 2/2003 |
| WO | 03/016387 A1 | | 2/2003 |
| WO | 2007/054223 A2 | | 5/2007 |
| WO | 2007/054224 A2 | | 5/2007 |
| WO | 2016/087247 A1 | | 6/2016 |

(Continued)

OTHER PUBLICATIONS

S. Georges, et al., "Polymyrcene microstructure revisited from precise high-field nuclear magnetic resonance analysis", Polymer 55 (2014) 3869-3878.
International Search Report dated Mar. 9, 2021, in corresponding PCT/FR2020/052354 (4 pages).

*Primary Examiner* — Deve V Hall
(74) *Attorney, Agent, or Firm* — VENABLE LLP

(57) ABSTRACT

A rubber composition having an adhesion to a composition based on natural rubber, the composition being at least based on 5 to 95 phr of polyisoprene comprising a content by weight of 1,4-cis bonds of at least 90% of the weight of the polyisoprene; 5 to 95 phr of copolymer of ethylene and of a 1,3-diene of formula $CH_2=CR-CH=CH_2$, the ethylene units in the copolymer representing more than 50 mol % of the monomer units of the copolymer, the symbol R representing a hydrocarbon chain having 3 to 20 carbon atoms; and a crosslinking system. Also disclosed is a tire, in particular a tire provided with a sidewall, comprising this composition.

15 Claims, No Drawings

(56) References Cited

FOREIGN PATENT DOCUMENTS

| WO | 2017/093654 A1 | 6/2017 |
| WO | 2018/020122 A1 | 2/2018 |
| WO | 2019/180356 A1 | 9/2019 |

* cited by examiner

RUBBER COMPOSITION

BACKGROUND

The field of the present invention is that of rubber compositions comprising a highly saturated diene elastomer, in particular compositions intended for use in a tyre, preferably in tyre sidewalls.

A tyre usually comprises two beads intended to come into contact with a rim, a crown composed of at least one crown reinforcement and a tread, and two sidewalls, the tyre being reinforced by a carcass reinforcement anchored in the two beads. A sidewall is an elastomer layer positioned outside the carcass reinforcement relative to the internal cavity of the tyre, between the crown and the bead, so as to totally or partially cover the region of the carcass reinforcement extending from the crown to the bead.

In the conventional manufacture of a tyre, the various constituent components of the crown, of the carcass reinforcement, of the beads and of the sidewalls are assembled to form a pneumatic tyre. The assembly step is followed by a step of forming the tyre so as to give the assembly the toric shape before the in-press curing step. As the sidewall of a tyre is subjected to cycles of deformation such as bending during rolling of the tyre, the rubber composition constituting a sidewall of a tyre must be both sufficiently flexible and not very hysteretic.

As the sidewall is also exposed to the action of the ozone, a rubber composition constituting a sidewall must have good ozone resistance properties. With a view to reducing the sensitivity of tyre sidewalls to the ozone, it has been proposed in document EP 2 682 423 A1 to use elastomers which are copolymers of ethylene and of 1,3-diene. Nevertheless, there still remains the concern of further improving the properties of the rubber compositions containing a diene copolymer which is rich in ethylene, in particular a diene copolymer for which the molar amount of ethylene is greater than 50%.

Specifically, the sidewall must adhere to the layer on which it is placed during the manufacture of the tyre. This layer is generally a carcass ply or an internal reinforcing rubber, the composition of which generally comprises a diene elastomer matrix, generally consisting of natural rubber.

Consequently, it remains important that the composition of the sidewall adheres well to a diene composition, in particular to improve the hold of the cured interfaces, and therefore the service life of the tyre.

Continuing its research, the applicant has discovered that the use of a copolymer of ethylene and of a specific 1,3-diene makes it possible to improve the adhesion of the composition to a diene composition.

SUMMARY

Thus, a first subject of the invention is a rubber composition at least based on:
- 5 to 95 phr of polyisoprene comprising a content by weight of 1,4-cis bonds of at least 90% of the weight of the polyisoprene,
- 5 to 95 phr of copolymer of ethylene and of a 1,3-diene of formula (I), the ethylene units in the copolymer representing more than 50 mol % of the monomer units of the copolymer, $CH_2=CR-CH=CH_2$ (I) the symbol R representing a hydrocarbon chain having 3 to 20 carbon atoms, and
- a crosslinking system.

Another object of the invention is a tyre comprising this composition.

DETAILED DESCRIPTION

I—Definitions

The expression "based on" used to define the constituents of a catalytic system or of a composition is understood to mean the mixture of these constituents, or the product of the reaction of a portion or of all of these constituents with one another.

The expression "composition based on" should be understood as meaning a composition including the mixture and/or the product of the in situ reaction of the various constituents used, some of these constituents being able to react and/or being intended to react with each other, at least partially, during the various phases of manufacture of the composition; the composition thus possibly being in the totally or partially crosslinked state or in the non-crosslinked state.

Unless otherwise indicated, the contents of the units resulting from the insertion of a monomer into a copolymer are expressed as molar percentage with respect to all of the monomer units of the copolymer.

The expression "phr" should be understood as meaning, for the purposes of the present invention, the part by weight per hundred parts by weight of elastomer.

Unless explicitly indicated otherwise, in the present text all percentages (%) indicated are percentages (%) by weight.

Furthermore, any interval of values denoted by the expression "between a and b" represents the range of values extending from more than a to less than b (i.e. limits a and b excluded), whereas any interval of values denoted by the expression "from a to b" means the range of values extending from a up to b (i.e. including the strict limits a and b). In the present document, when an interval of values is denoted by the expression "from a to b", the interval represented by the expression "between a and b" is also and preferentially denoted.

When reference is made to a "predominant" compound, this is understood to mean, for the purposes of the present invention, that this compound is predominant among the compounds of the same type in the composition, that is to say that it is that which represents the greatest amount by weight among the compounds of the same type. Thus, for example, a predominant elastomer is the elastomer representing the greatest weight relative to the total weight of the elastomers in the composition. In the same way, a "predominant" filler is that representing the greatest weight among the fillers of the composition. By way of example, in a system comprising just one elastomer, the latter is predominant for the purposes of the present invention and, in a system comprising two elastomers, the predominant elastomer represents more than half of the weight of the elastomers. On the contrary, a "minor" compound is a compound which does not represent the greatest fraction by weight among the compounds of the same type. Preferably, the term "predominant" is intended to mean present at more than 50%, preferably more than 60%, 70%, 80%, 90%, and more preferentially the "predominant" compound represents 100%.

The carbon-comprising compounds mentioned in the description can be of fossil or biobased origin. In the latter case, they can partially or completely result from biomass or be obtained from renewable starting materials resulting from biomass. Polymers, plasticizers, fillers, and the like, are concerned in particular.

All the values for glass transition temperature "Tg" described in the present document are measured in a known way by DSC (Differential Scanning calorimetry) according to Standard ASTM D3418 (1999).

II—Description of the Invention

II-1 Elastomer Matrix

According to the invention, the composition comprises from 5 to 95 phr of copolymer of ethylene and of a 1,3-diene of formula (I), the ethylene units in the copolymer representing more than 50 mol % of the monomer units of the copolymer, $$CH2=CR-CH=CH2 \tag{I}$$

the symbol R representing a hydrocarbon chain having 3 to 20 carbon atoms.

Preferably, the copolymer contains ethylene units which represent between 50 mol % and 95 mol % of the monomer units of the copolymer, that is to say between 50 mol % and 95 mol % of the ethylene units and of the units of the 1,3-diene. Very preferably, the copolymer contains ethylene units which represent from 60 mol % to 90 mol %, preferably from 70 mol % to 85 mol %, of the monomer units of the copolymer.

The 1,3-diene of formula (I) is a substituted 1,3 diene, which can give rise to units of 1,2 configuration represented by formula (1), of 3,4 configuration represented by formula (2) and of 1,4 configuration, the trans form of which is represented below by formula (3).

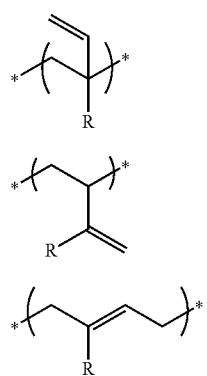

As is also well known, the ethylene unit is a unit of —(CH$_2$—CH$_2$)— moiety.

The copolymer which is useful for the purposes of the invention is a copolymer of ethylene and of the 1,3-diene, which implies that the monomer units of the copolymer are units resulting from the polymerization of ethylene and of the 1,3-diene. The copolymer thus comprises ethylene units and units of the 1,3-diene. According to the invention, the 1,3-diene can be just one compound, that is to say just one 1,3-diene of formula (I), or can be a mixture of 1,3-dienes of formula (I), the 1,3-dienes of the mixture differing from one another by the group represented by the symbol R. The copolymer which is useful for the purposes of the invention is advantageously a random copolymer according to any one of the embodiments of the invention.

According to a first variant of the invention, the copolymer contains units of the 1,3-diene of 1,2 or 3,4 configuration which represent more than 50 mol % of the units of the 1,3-diene. In other words, in the copolymer the units of the 1,3-diene contain more than 50 mol % of the units of 1,2 configuration or of 3,4 configuration. In this variant, the balance to 100 mol % of the units of the 1,3-diene in the copolymer is completely or partially formed of units of the 1,3-diene of 1,4 configuration. According to this first variant, preferentially more than half of the units of the 1,3-diene of 1,4 configuration are of trans-1,4 configuration, more preferentially all the units of the 1,3-diene of 1,4 configuration are of trans-1,4 configuration.

According to a second variant of the invention, in the copolymer the units of the 1,3-diene contain more than 50% of 1,4 configuration. In other words, the units of the 1,3-diene of 1,4 configuration represent more than 50 mol % of the units of the 1,3-diene. In this variant, the balance to 100 mol % of the units of the 1,3-diene in the copolymer is completely or partially formed of units of the 1,3-diene of 1,2 or 3,4 configuration. Preferably, the units of the 1,3-diene of 1,4 configuration represent more than 70 mol % of the units of the 1,3-diene. Advantageously, more than half of the units of the 1,3-diene of 1,4 configuration are of trans-1,4 configuration, which means that the units of the 1,3-diene of trans-1,4 configuration represent more than 50 mol % of the units of the 1,3-diene of 1,4 configuration.

Whatever the abovementioned variant, in formula (I) of the 1,3-diene, the hydrocarbon chain represented by the symbol R can be an unsaturated chain of from 3 to 20 carbon atoms. Preferably, the symbol R represents a hydrocarbon chain having from 6 to 16 carbon atoms. The hydrocarbon chain represented by the symbol R can be a saturated or unsaturated chain. Preferably, the symbol R represents an aliphatic chain, in which case in formula (I) of the 1,3-diene, the hydrocarbon chain represented by the symbol R is an aliphatic hydrocarbon chain. It can be a linear or branched chain, in which case the symbol R represents a linear or branched chain. Preferably, the hydrocarbon chain is acyclic, in which case the symbol R represents an acyclic chain. Preferably, the symbol R represents an unsaturated and branched acyclic hydrocarbon chain. The hydrocarbon chain represented by the symbol R is advantageously an unsaturated and branched acyclic chain containing from 3 to 20 carbon atoms, in particular from 6 to 16 carbon atoms. Very advantageously, the 1,3-diene is myrcene or β-farnesene.

According to a preferential embodiment of the invention, the 1,3-diene is myrcene. According to another preferential embodiment of the invention, the 1,3-diene is β-farnesene. Preferably, the copolymer of ethylene and of the 1,3-diene has a glass temperature below −35° C., preferably between −90° C. and −35° C.

The copolymer may be prepared by a process which comprises the copolymerization of ethylene and of the 1,3-diene in the presence of a catalytic system based at least on a metallocene of formula (II) and on an organomagnesium compound of formula (III)

$$P(Cp^1Cp^2)Nd(BH_4)_{(1+y)}L_y\text{-}N_x \tag{II}$$

$$MgR^1R^2 \tag{III}$$

in which:
Cp$^1$ and Cp$^2$, which may be identical or different, being selected from the group consisting of the cyclopentadienyl group of formula C$_5$H$_4$, the unsubstituted fluorenyl group of formula C$_{13}$H$_8$ and substituted fluorenyl groups, P being a group bridging the two Cp$^1$ and Cp$^2$ groups and representing a ZR$^3$R$^4$ group, Z representing a silicon or carbon atom, R$^3$ and R$^4$, which may be identical or different, each representing an alkyl group comprising from 1 to 20 carbon atoms, preferably a methyl, y, which is an integer, being equal to or greater than 0, x, which is or is not an integer, being equal to or greater than 0, L representing an alkali metal selected from the group consisting of lithium, sodium and potassium, N representing a molecule of an ether, preferably diethyl ether or tetrahydrofuran, R$^1$ and R$^2$, which may be identical or different, representing a carbon group.

Mention may be made, as substituted fluorenyl groups, of those substituted by alkyl radicals having from 1 to 6 carbon atoms or by aryl radicals having from 6 to 12 carbon atoms. The choice of the radicals is also guided by the accessibility to the corresponding molecules, which are the substituted fluorenes, because the latter are commercially available or can be easily synthesized.

Mention may more particularly be made, as substituted fluorenyl groups, of the 2,7-di(tert-butyl)fluorenyl and 3,6-di(tert-butyl)fluorenyl groups. The 2, 3, 6 and 7 positions respectively denote the position of the carbon atoms of the rings as represented in the scheme below, the 9 position corresponding to the carbon atom to which the bridge P is attached.

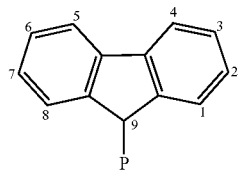

The catalytic system can be prepared conventionally by a process analogous to that described in patent application WO 2007054224 or WO 2007054223. For example, the organomagnesium compound and the metallocene are reacted in a hydrocarbon solvent typically at a temperature ranging from 20° C. to 80° C. for a period of time of between 5 and 60 minutes. The catalytic system is generally prepared in an aliphatic hydrocarbon solvent, such as methylcyclohexane, or an aromatic hydrocarbon solvent, such as toluene. Generally, after its synthesis, the catalytic system is used in this form in the process for the synthesis of the copolymer in accordance with the invention.

Alternatively, the catalytic system can be prepared by a process analogous to that described in patent application WO 2017093654 A1 or in patent application WO 2018020122 A1. According to this alternative, the catalytic system further contains a preformation monomer selected from a conjugated diene, ethylene or a mixture of ethylene and a conjugated diene, in which case the catalytic system is based at least on the metallocene, the organomagnesium compound and the preformation monomer. For example, the organomagnesium compound and the metallocene are reacted in a hydrocarbon solvent typically at a temperature of from 20° C. to 80° C. for 10 to 20 minutes in order to obtain a first reaction product, then the preformation monomer, selected from a conjugated diene, ethylene or a mixture of ethylene and of a conjugated diene, is reacted with this first reaction product at a temperature ranging from 40° C. to 90° C. for 1 h to 12 h. The conjugated diene, as preformation monomer, is preferably a 1,3-diene such as 1,3-butadiene, isoprene or else a 1,3-diene of formula (I), in particular myrcene or β-farnesene. The catalytic system thus obtained can be used immediately in the process in accordance with the invention or be stored under an inert atmosphere before it is used in the process in accordance with the invention.

The metallocene used for preparing the catalytic system can be in the form of a crystalline or non-crystalline powder, or else in the form of single crystals. The metallocene can be provided in a monomer or dimer form, these forms depending on the method of preparation of the metallocene, as for example is described in patent application WO 2007054224 or WO 2007054223. The metallocene can be prepared conventionally by a process analogous to that described in patent application WO 2007054224 or WO 2007054223, in particular by reaction, under inert and anhydrous conditions, of the salt of an alkali metal of the ligand with a rare earth metal borohydride in a suitable solvent, such as an ether, for example diethyl ether or tetrahydrofuran, or any other solvent known to those skilled in the art. After reaction, the metallocene is separated from the reaction by-products by techniques known to those skilled in the art, such as filtration or precipitation from a second solvent. In the end, the metallocene is dried and isolated in the solid form.

Like any synthesis carried out in the presence of an organometallic compound, the synthesis of the metallocene and that of the catalytic system take place under anhydrous conditions under an inert atmosphere. Typically, the reactions are carried out starting from anhydrous solvents and compounds under anhydrous nitrogen or argon.

The organomagnesium compound useful for the purposes of the invention is of formula MgR$^1$R$^2$, in which R$^1$ and R$^2$, which may be identical or different, represent a carbon group. Carbon group is understood to mean a group which contains one or more carbon atoms. Preferably, R$^1$ and R$^2$ contain from 2 to 10 carbon atoms. More preferentially, R$^1$ and R$^2$ each represent an alkyl. The organomagnesium compound is advantageously a dialkylmagnesium compound, better still butylethylmagnesium or butyloctylmagnesium, even better still butyloctylmagnesium.

According to any one of the embodiments of the invention, the molar ratio of the organomagnesium compound to the metal Nd constituting the metallocene is preferably within a range extending from 1 to 100, more preferentially is greater than or equal to 1 and less than 10. The range of values extending from 1 to less than 10 is in particular more favourable for obtaining copolymers of high molar masses.

When the copolymer useful for the purposes of the invention is a copolymer which has a microstructure as defined according to the first variant of the invention, it is prepared according to the process mentioned in the present application using a metallocene of formula (II) in which Cp$^1$ and Cp$^2$, which may be identical or different, are selected from the group consisting of substituted fluorenyl groups and the unsubstituted fluorenyl group of formula C$_{13}$H$_8$. For this variant, the metallocenes of the following formulae, in which the symbol Flu presents the fluorenyl group of formula C$_{13}$H$_8$, are particularly suitable: [{Me$_2$SiFlu$_2$Nd(μ-BH$_4$)$_2$Li(THF)}$_2$]; [Me$_2$SiFlu$_2$Nd(μ-BH$_4$)$_2$Li(THF)]; [Me$_2$SiFlu$_2$Nd(μ-BH$_4$)(THF)]; [{Me$_2$SiFlu$_2$Nd(μ-BH$_4$)(THF)}$_2$]; [Me$_2$SiFlu$_2$Nd(μ-BH$_4$)].

When the copolymer useful for the purposes of the invention is a copolymer which has a microstructure as defined according to the second variant of the invention, it is prepared according to the process mentioned in the present application using a metallocene of formula (II) in which $Cp^1$ denotes a cyclopentadienyl group Cp of formula $C_5H_4$ and $Cp^2$ denotes a fluorenyl group Flu of formula $C_{13}H_8$.

Those skilled in the art also know how to adjust the polymerization conditions and the concentrations of each of the reactants (constituents of the catalytic system, monomers) according to the equipment (devices, reactors) used to carry out the polymerization and the various chemical reactions. As is known to those skilled in the art, the copolymerization and the handling of the monomers, of the catalytic system and of the polymerization solvent(s) take place under anhydrous conditions and under an inert atmosphere. The polymerization solvents are typically aliphatic or aromatic hydrocarbon solvents.

The polymerization is preferably carried out in solution, continuously or batchwise. The polymerization solvent can be an aromatic or aliphatic hydrocarbon solvent. Mention may be made, as examples of polymerization solvent, of toluene and methylcyclohexane. The monomers can be introduced into the reactor containing the polymerization solvent and the catalytic system or, conversely, the catalytic system can be introduced into the reactor containing the polymerization solvent and the monomers. The copolymerization is typically carried out under anhydrous conditions and in the absence of oxygen, in the optional presence of an inert gas. The polymerization temperature generally varies within a range extending from 30 to 150° C., preferentially from 30 to 120° C. Preferably, the copolymerization is carried out at constant ethylene pressure.

During the polymerization of ethylene and the 1,3-diene in a polymerization reactor, ethylene and 1,3-diene can be added continuously to the polymerization reactor, in which case the polymerization reactor is a fed reactor. This embodiment is very particularly suitable for the synthesis of a random copolymer.

The polymerization can be halted by cooling the polymerization medium. The polymer can be recovered according to conventional techniques known to those skilled in the art, such as, for example, by precipitation, by evaporation of the solvent under reduced pressure or by steam stripping.

Preferably, the rubber composition according to the invention comprises from 15 to less than 50 phr, preferably from 20 to 45 phr, of a copolymer of ethylene and of a 1,3-diene of formula (I) as defined in any one of the embodiments described above, including variants thereof. It is understood that the copolymer may consist of a mixture of copolymers which differ from one another in their microstructure or their macrostructure.

According to the invention, the composition also comprises from 5 to 95 phr of polyisoprene comprising a content by weight of 1,4-cis bonds of at least 90% of the weight of the polyisoprene.

Advantageously, the polyisoprene is a polyisoprene comprising a content by weight of 1,4-cis bonds of at least 98% of the weight of the polyisoprene.

Preferably, the polyisoprene is selected from the group consisting of natural rubber, synthetic polyisoprenes, and mixtures thereof. More preferably, the polyisoprene is a natural rubber.

Advantageously, the content of the polyisoprene, preferably of natural rubber, in the composition according to the invention is within a range extending from more than 50 to 85 phr, preferably from 55 to 80 phr.

II-2 Reinforcing Filler

The composition according to the invention may also comprise a reinforcing filler. Such a reinforcing filler typically consists of nanoparticles, the (weight-)average size of which is less than a micrometre, generally less than 500 nm, most often between 20 and 200 nm, in particular and more preferentially between 20 and 150 nm.

The reinforcing filler can comprise carbon black, silica, or a mixture thereof. The composition of the first layer of the laminate according to the invention can mainly consist of silica. Preferably, it can mainly, preferably exclusively, consist of carbon black. More preferably, the reinforcing filler consists of at least 80% by weight, preferably of at least 90% by weight, of carbon black. Preferably, the reinforcing filler comprises exclusively, that is to say 100% by weight, carbon black. The carbon black may be a mixture of different carbon blacks, in which case the contents of carbon black relate to all of the carbon blacks.

All carbon blacks, in particular the blacks conventionally used in tyres or their treads, are suitable as carbon blacks. Among the latter, mention will more particularly be made of the reinforcing carbon blacks of the 100, 200 and 300 series, or the blacks of the 500, 600 or 700 series (ASTM D-1765-2017 grades), such as, for example, the N115, N134, N234, N326, N330, N339, N347, N375, N550, N683 and N772 blacks. These carbon blacks can be used in the isolated state, as available commercially, or in any other form, for example as support for some of the rubber additives used. The carbon blacks might, for example, be already incorporated in the diene elastomer, in particular isoprene elastomer, in the form of a masterbatch (see, for example, applications WO97/36724-A2 and WO99/16600-A1).

The content of reinforcing filler is adjusted by those skilled in the art according to the use of the rubber composition. Advantageously, the content of reinforcing filler, preferably of carbon black, in the composition according to the invention, is within a range extending from 15 to 80 phr, preferably from 20 to 55 phr, preferably from 25 to 45 phr.

Also preferably, the volume fraction of reinforcing filler, preferably of carbon black, in the composition according to the invention is within a range extending from 8% to 15%. In a known manner, the volume fraction of a constituent in a rubber composition is defined as being the ratio of the volume of this constituent to the volume of all the constituents of the composition, it being understood that the volume of all the constituents is calculated by adding together the volume of each of the constituents of the composition. The volume fraction of carbon black in a composition is therefore defined as the ratio of the volume of carbon black to the sum of the volumes of each of the constituents of the composition. The volume of a constituent is accessible through the ratio between the weight of the constituent introduced into the rubber composition and the density of the constituent. In a known manner, the volume fraction of carbon black for a given content in phr of carbon black can be adjusted by introducing a plasticizer into the composition.

Silicas that are suitable include any type of precipitated silica, in particular highly dispersible precipitated silicas (referred to as "HDS" for "highly dispersible" or "highly dispersible silica"). These precipitated silicas, which are or are not highly dispersible, are well known to those skilled in the art. Mention may be made, for example, of the silicas described in applications WO03/016215-A1 and WO03/016387-A1. Use may in particular be made, among commercial HDS silicas, of the Ultrasil® 5000GR and Ultrasil® 7000GR silicas from Evonik or the Zeosil® 1085GR, Zeosil® 1115 MP, Zeosil® 1165MP, Zeosil® Premium 200MP and Zeosil® HRS 1200 MP silicas from Solvay. Use may be made, as non-HDS silica, of the following commercial silicas: the Ultrasil® VN2GR and Ultrasil® VN3GR silicas from Evonik, the Zeosil® 175GR silica from Solvay or the Hi-Sil EZ120G(-D), Hi-Sil EZ160G(-D), Hi-Sil EZ200G(-D), Hi-Sil 243LD, Hi-Sil 210 and Hi-Sil HDP 320G silicas from PPG.

Use may be made, in order to couple the silica to the diene elastomer, in a well-known way, of an at least bifunctional coupling agent (or bonding agent) intended to provide a satisfactory connection, of chemical and/or physical nature, between the inorganic filler (surface of its particles) and the diene elastomer. Use is made in particular of organosilanes or polyorganosiloxanes which are at least bifunctional. The term "bifunctional" is understood to mean a compound having a first functional group capable of interacting with the inorganic filler and a second functional group capable of interacting with the diene elastomer. For example, such a bifunctional compound can comprise a first functional group comprising a silicon atom, said first functional group being capable of interacting with the hydroxyl groups of an inorganic filler, and a second functional group comprising a sulfur atom, said second functional group being capable of interacting with the diene elastomer.

Preferably, the organosilanes are selected from the group consisting of organosilane polysulfides (symmetrical or asymmetrical), such as bis(3-triethoxysilylpropyl) tetrasulfide, abbreviated to TESPT, sold under the name Si69 by Evonik, or bis(3-triethoxysilylpropyl)disulfide, abbreviated to TESPD, sold under the name Si75 by Evonik, polyorganosiloxanes, mercaptosilanes, blocked mercaptosilanes, such as S-(3-(triethoxysilyl)propyl) octanethioate, sold by Momentive under the name NXT Silane. More preferentially, the organosilane is an organosilane polysulfide.

When silica is used, the content of coupling agent in the composition of the first layer of the laminate of the invention can easily be adjusted by those skilled in the art. Typically, the content of coupling agent represents from 0.5% to 15% by weight, with respect to the amount of silica.

II-3 Crosslinking System

The crosslinking system can be any type of system known to those skilled in the art in the field of rubber compositions for tyres. It may in particular be based on sulfur, and/or on peroxide and/or on bismaleimides.

Preferentially, the crosslinking system is based on sulfur; it is then called a vulcanization system. The sulfur can be contributed in any form, in particular in the form of molecular sulfur or of a sulfur-donating agent. At least one vulcanization accelerator is also preferentially present, and, optionally, also preferentially, use may be made of various known vulcanization activators, such as zinc oxide, stearic acid or equivalent compound, such as stearic acid salts, and salts of transition metals, guanidine derivatives (in particular diphenylguanidine), or also known vulcanization retarders.

The sulfur is used at a preferential content of between 0.3 phr and 10 phr, more preferentially between 0.3 and 5 phr. The primary vulcanization accelerator is used at a preferential content of between 0.5 and 10 phr, more preferentially of between 0.5 and 5 phr.

Use may be made, as accelerator, of any compound capable of acting as accelerator of the vulcanization of diene elastomers in the presence of sulfur, in particular accelerators of the thiazole type, and also their derivatives, or accelerators of sulfenamide, thiuram, dithiocarbamate, dithiophosphate, thiourea and xanthate types. Mention may in particular be made, as examples of such accelerators, of the following compounds: 2-mercaptobenzothiazyl disulfide (abbreviated to "MBTS"), N-cyclohexyl-2-benzothiazolesulfenamide ("CBS"), N,N-dicyclohexyl-2-benzothiazolesulfenamide ("DCBS"), N-(tert-butyl)-2-benzothiazolesulfenamide ("TBBS"), N-(tert-butyl)-2-benzothiazolesulfenimide ("TBSI"), tetrabenzylthiuram disulfide ("TBZTD"), zinc dibenzyldithiocarbamate ("ZBEC") and the mixtures of these compounds.

II-4 Possible Additives

The rubber composition which is useful for the purposes of the invention may also comprise all or some of the usual additives normally used in elastomer compositions intended for use in a tyre, such as, for example, processing agents, plasticizers, pigments, protective agents such as anti-ozone waxes, chemical anti-ozonants, antioxidants. Preferably, the rubber composition comprises a plasticizer. Suitable plasticizers are all the plasticizers conventionally used in tyres. In this respect, mention may be made of oils which are preferentially non-aromatic or very weakly aromatic, selected from the group consisting of naphthenic oils, paraffin oils, MES oils, TDAE oils, plant oils, ether plasticizers, ester plasticizers.

II-5 Preparation of the Rubber Compositions

The compositions in accordance with the invention can be manufactured in appropriate mixers using two successive preparation phases well known to those skilled in the art:

a first phase of thermomechanical working or kneading ("non-productive" phase), which can be carried out in a single thermomechanical step during which all the necessary constituents, in particular the elastomeric matrix, the reinforcing filler and the optional other various additives, with the exception of the crosslinking system, are introduced into an appropriate mixer, such as a standard internal mixer (for example of 'Banbury' type). The incorporation of the optional filler into the elastomer can be carried out in one or more goes by thermomechanically kneading. In the case where the filler is already incorporated, in full or in part, in the elastomer in the form of a masterbatch, as is described, for example, in applications WO 97/36724 and WO 99/16600, it is the masterbatch which is directly kneaded and, if appropriate, the other elastomers or fillers present in the composition which are not in the masterbatch form, and also the optional other various additives other than the crosslinking system, are incorporated. The non-productive phase can be carried out at high temperature, up to a maximum temperature of between 110° C. and 200° C., preferably between 130° C. and 185° C., for a period of time generally of between 2 and 10 minutes.

a second phase of mechanical working ("productive" phase), which is carried out in an external mixer, such as an open mill, after cooling the mixture obtained during the first non-productive phase down to a lower temperature, typically of less than 120° C., for example between 40° C. and 100° C. The crosslinking system is then incorporated and the combined mixture is then mixed for a few minutes, for example between 5 and 15 min.

Such phases have been described, for example, in applications EP-A-0501227, EP-A-0735088, EP-A-0810258, WO 00/05300 or WO 00/05301.

The final composition thus obtained is then calendered, for example in the form of a sheet or of a slab, in particular for characterization in the laboratory, or else extruded (or co-extruded with another rubber composition) in the form of a semi-finished (or profiled) element of rubber that can be used for example as a tyre sidewall. These products can then be used for the manufacture of tyres, according to the techniques known to those skilled in the art.

The composition may be either in the uncured state (before crosslinking or vulcanization) or in the cured state (after crosslinking or vulcanization), may be a semi-finished product that can be used in a tyre.

The crosslinking (or curing), where appropriate the vulcanization, is carried out in a known manner at a temperature generally of between 130° C. and 200° C., for a sufficient time which may vary, for example, between 5 and 90 min, depending especially on the curing temperature, on the crosslinking system adopted and on the crosslinking kinetics of the composition in question.

II-6 Tyre

Another subject of the present invention is a tyre comprising a rubber composition according to the invention.

Preferably, the composition according to the invention is present at least in a sidewall of the tyre according to the invention. Advantageously, this composition is present exclusively in the sidewalls of the tyre.

The tyre according to the invention can be intended to equip motor vehicles of private passenger type, SUVs (sport utility vehicles), or two-wheeled vehicles (in particular motorbikes), or aeroplanes, or else industrial vehicles chosen from vans, heavy-goods vehicles—that is to say underground trains, buses, road haulage vehicles (lorries, tractors, trailers), off-road vehicles such as agricultural vehicles or civil engineering plant—and more.

III—Preferred Embodiments

In the light of the above, the preferred embodiments of the invention are described below:

A. Rubber composition at least based on:
  5 to 95 phr of polyisoprene comprising a content by weight of 1,4-cis bonds of at least 90% of the weight of the polyisoprene,
  5 to 95 phr of copolymer of ethylene and of a 1,3-diene of formula (I), the ethylene units in the copolymer representing more than 50 mol % of the monomer units of the copolymer, $$CH_2=CR-CH=CH_2 \qquad (I)$$

the symbol R representing a hydrocarbon chain having 3 to 20 carbon atoms, and
  a crosslinking system.

B. Rubber composition according to embodiment A, wherein the copolymer contains ethylene units which represent between 50 mol % and 95 mol %, preferably from 60 mol % to 90 mol %, more preferably from 70 mol % to 85 mol %, of the monomer units of the copolymer.

C. Rubber composition according to any one of the preceding embodiments, wherein the copolymer contains units of the 1,3-diene of 1,2 or 3,4 configuration which represent more than 50 mol % of the units of the 1,3-diene.

D. Rubber composition according to any one of the preceding embodiments, wherein the symbol R represents a hydrocarbon chain having 6 to 16 carbon atoms.

E. Rubber composition according to any one of the preceding embodiments, wherein the symbol R represents an aliphatic chain.

F. Rubber composition according to any one of the preceding embodiments, wherein the symbol R represents an acyclic chain.

G. Rubber composition according to any of the preceding embodiments, wherein the symbol R represents a linear or branched chain.

H. Rubber composition according to any one of the preceding embodiments, wherein the 1,3-diene is myrcene or β-farnesene.

I. Rubber composition according to any one of the preceding embodiments, wherein the copolymer has a glass transition temperature below −35° C., preferably between −90° C. and −35° C.

J. Rubber composition according to any one of the preceding embodiments, wherein the content of the copolymer is within a range extending from from 15 to less than 50 phr.

K. Rubber composition according to any one of the preceding embodiments, wherein the polyisoprene comprises a content by weight of 1,4-cis bonds of at least 98% of the weight of the polyisoprene.

L. Rubber composition according to any one of the preceding embodiments, wherein the polyisoprene is selected from the group consisting of natural rubber, synthetic polyisoprenes and mixtures thereof; preferably the polyisoprene is a natural rubber.

M. Rubber composition according to any one of the preceding embodiments, wherein the copolymer has a glass transition temperature below −35° C., preferably between −90° C. and −35° C.

N. Rubber composition according to any one of the preceding embodiments, also comprising a reinforcing filler.

O. Rubber composition according to embodiment N, wherein the reinforcing filler comprises mainly carbon black.

P Rubber composition according to embodiment N, wherein the reinforcing filler comprises mainly silica.

Q. Rubber composition according to any one of the preceding embodiments, wherein the content of reinforcing filler is within a range extending from 15 to 80 phr, preferably from 20 to 55 phr, preferably from 25 to 45 phr.

R. Rubber composition according to any one of the preceding embodiments, wherein the volume fraction of the reinforcing filler, preferably of the carbon black, is within a range extending from 8% to 17%, preferably from 8% to 15%.

S. Rubber composition according to any one of embodiments A to 0, Q and R, wherein the content of the polyisoprene is within a range extending from more than 50 to 85 phr, the content of the copolymer is within a range extending from 15 to less than 50 phr, and comprising a reinforcing filler comprising mainly carbon black.

T. Tyre comprising a rubber composition defined in any one of embodiments A to S.

U. Tyre according to embodiment T, wherein the rubber composition defined in any one of embodiments A to S is present in at least one sidewall of the tyre.

IV—Examples

IV-1 Measurements and Tests Used

IV-1.1 Determination of the Microstructure of the Elastomers:

The spectral characterization and the measurements of the microstructure of the copolymers of ethylene and of 1,3-myrcene are carried out by nuclear magnetic resonance (NMR) spectroscopy.

Spectrometer: For these measurements, a Bruker Avance III HD 400 MHz spectrometer is used, equipped with a Bruker cryo-BBFO z-grad 5 mm probe.

Experiments: The $^1$H experiments are recorded using a radiofrequency pulse with a tilt angle of 30°, the number of repetitions is 128 with a recycle delay of 5 seconds. The HSQC (Heteronuclear Single Quantum Coherence) and HMBC (Heteronuclear Multiple-Bond Correlation) $^1$H-$^{13}$C NMR correlation experiments are recorded with a number of repetitions of 128 and a number of increments of 128. The experiments are carried out at 25° C.

Preparation of the sample: 25 mg of sample are dissolved in 1 ml of deuterated chloroform (CDCl$_3$).

Sample calibration: The axes of the $^1$H and $^{13}$C chemical shifts are calibrated with respect to the protonated impurity of the solvent (CHCl$_3$) at $\delta_{1H}$=7.2 ppm and $\delta_{13C}$=77 ppm.

Spectral assignment for the copolymers of ethylene and of 1,3-myrcene: In the representations A, B and C below, the symbols R1 and R2 represent the attachment points of the unit to the polymer chain. The signals of the insertion forms of the 1,3-diene A, B and C were observed on the different spectra recorded. According to S. George et al., (Polymer 55 (2014) 3869-3878), the signal of the —CH═group No. 8″ characteristic of form C exhibits $^1$H and $^{13}$C chemical shifts identical to the —CH═group No. 3. The chemical shifts of the signals characteristic of the moieties A, B and C are presented in Table 1. The moieties A, B and C correspond respectively to the units of 3,4 configuration, of 1,2 configuration and of trans-1,4 configuration. The quantifications were carried out from the integration of the 1D $^1$H NMR spectra using the Topspin software. The integrated signals for the quantification of the various moieties are:

Ethylene: signal at 1.2 ppm corresponding to 4 protons

Total myrcene: signal No. 1 (1.59 ppm) corresponding to 6 protons

Form A: signal No. 7 (4.67 ppm) corresponding to 2 protons

Form B: signal No. 8' (5.54 ppm) corresponding to 1 proton.

The quantification of the microstructure is carried out in molar percentage (molar %) as follows: Molar % of a moiety=$^1$H integral of a moiety×100/Σ($^1$H integrals of each moiety).

TABLE 1

Assignment of the $^1$H and $^{13}$C signals of Ethylene-Myrcene copolymers

| $\delta_{1H}$ (ppm) | $\delta_{13C}$ (ppm) | Group |
|---|---|---|
| 5.54 | 146.4 | 8' |
| 5.07 | 124.6 | 3 + 8″ |
| 4.97-4.79 | 112.0 | 9' |
| 4.67 | 108.5 | 7 |
| 2.06 | 26.5 | 4 |

TABLE 1-continued

Assignment of the $^1$H and $^{13}$C signals of Ethylene-Myrcene copolymers

| $\delta_{1H}$ (ppm) | $\delta_{13C}$ (ppm) | Group |
|---|---|---|
| 2.0-1.79 | 31.8 | 5 + 5' + 5″ |
| | 44.5 | 8 |
| 1.59 | 25.9 and 7.0 | 1 |
| 1.2 | 36.8-24.0 | CH$_2$ ethylene |

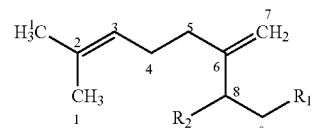

A

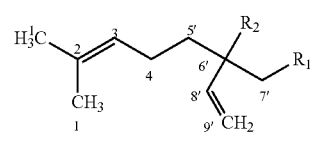

B

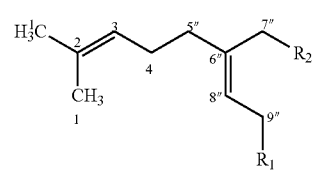

C

IV-1.2 Determination of the Glass Transition Temperature of the Polymers:

The glass transition temperature is measured by means of a differential calorimeter (differential scanning calorimeter) according to Standard ASTM D3418 (1999).

IV-2 Synthesis of the Polymers

In the synthesis of copolymers in accordance with the invention, the 1,3-diene used is myrcene, a 1,3-diene of formula (I) in which R is a hydrocarbon group having 6 carbon atoms: CH$_2$—CH$_2$—CH═CMe$_2$.

All the reagents are obtained commercially, except the metallocenes. [{Me$_2$SiFlu$_2$Nd(μ-BH$_4$)$_2$Li(THF)}] is prepared according to the procedure described in patent application WO 2007/054224.

The butyloctylmagnesium BOMAG (20% in heptane, C=0.88 mol·l$^{-1}$) originates from Chemtura and is stored in a Schlenk tube under an inert atmosphere. The ethylene, of N35 grade, originates from Air Liquide and is used without prepurification. The myrcene (purity≥95%) is obtained from Sigma-Aldrich.

IV-2.1—Copolymer of Ethylene and of 1,3-Butadiene: Elastomer E1

To a reactor containing, at 80° C., methylcyclohexane, ethylene (Et) and butadiene (Bd) in the proportions indicated in Table 2, butyloctylmagnesium (BOMAG) is added to neutralize the impurities in the reactor, then the catalytic system is added (see Table 2). At this time, the reaction temperature is regulated at 80° C. and the polymerization reaction starts. The polymerization reaction takes place at a constant pressure of 8 bar. The reactor is fed throughout the polymerization with ethylene and butadiene in the proportions defined in Table 2. The polymerization reaction is halted by cooling, degassing of the reactor and addition of ethanol. An antioxidant is added to the polymer solution. The copolymer is recovered by drying in an oven under vacuum to constant weight. The catalytic system is a preformed catalytic system. It is prepared in methylcyclohexane from a metallocene, [Me$_2$SiFlu$_2$Nd(μ-BH$_4$)$_2$Li(THF)], a co-catalyst, butyloctylmagnesium (BOMAG), and a preformation monomer, 1,3-butadiene, in the contents indicated in Table 2. It is prepared according to a preparation method in accordance with paragraph II.1 of patent application WO 2017/093654.

IV-2.2—Copolymer of Ethylene and of Myrcene: Elastomer E2

To a reactor containing, at 80° C., methylcyclohexane, ethylene and myrcene (My) in the proportions indicated in Table 2, butyloctylmagnesium (BOMAG) is added to neutralize the impurities in the reactor, then the catalytic system is added (see Table 2). At this time, the reaction temperature is regulated at 80° C. and the polymerization reaction starts. The polymerization reaction takes place at a constant pressure of 8 bar. The reactor is fed throughout the polymerization with ethylene and myrcene in the proportions defined in Table 2. The polymerization reaction is halted by cooling, degassing of the reactor and addition of ethanol. An antioxidant is added to the polymer solution. The copolymer is recovered by drying in an oven under vacuum to constant weight. The catalytic system is a preformed catalytic system. It is prepared in methylcyclohexane from a metallocene, [Me$_2$SiFlu$_2$Nd(μ-BH$_4$)$_2$Li(THF)], a co-catalyst, butyloctylmagnesium (BOMAG), and a preformation monomer, 1,3-butadiene, in the contents indicated in Table 2. It is prepared according to a preparation method in accordance with paragraph II.1 of patent application WO 2017/093654.

The microstructure of the polymers and the properties thereof are shown in Tables 3 and 4.

TABLE 2

| Synthesis | E1 | E2 |
|---|---|---|
| Metallocene concentration (mmol/l) | 0.07 | 0.039 |
| Alkylant agent concentration (mmol/l) | 0.36 | 0.2 |
| Preformation monomer/Nd metal molar ratio | 90 | 90 |
| Composition of the feed (mol % Et/Bd) | 80/20 | — |
| Composition of the feed (mol % Et/My) | — | 65/35 |

TABLE 3

| Elastomer | E1 | E2 |
|---|---|---|
| Et (mol %) | 78 | 76 |
| Bd (mol %) | 14 | |
| 1,2-Cyclohexanediyl (mol %) | 8 | |
| My (mol %) | — | 24 |
| 1,4 Myrcene (mol %/mol % My) | — | 29 |
| 1,2 Myrcene (mol %/mol % My) | — | 4 |
| 3,4 Myrcene (mol %/mol % My) | — | 67 |

TABLE 4

| Elastomer | Tg (° C.) |
|---|---|
| E1 | −40 |
| E2 | −63 |

IV-3 Preparation of the Rubber Compositions

In the examples which follow, the rubber compositions were produced as described in point II-5 above. In particular, the "non-productive" phase was carried out in a 3 litre mixer for 5 minutes, for a mean blade speed of 50 revolutions per minute, until a maximum dropping temperature of 160° C. was reached. The "productive" phase was carried out in an open mill at 23° C. for 10 minutes.

IV-4 Rubber Tests

The adhesion of several rubber compositions comprising a mixture of natural rubber and copolymer of ethylene and of 1,3-diene on a composition based on natural rubber was compared according to the nature and the content of the copolymer of ethylene and of 1,3-diene.

The adhesion measurements were carried out using a T-type peel test, also referred to as 180° peeling. The peeling test specimens are produced by bringing into contact the two layers (the compositions constituting the layers being in the uncured state) for which the adhesion is to be tested. An incipient crack was inserted between the two layers. Each of the layers was reinforced by a composite ply which limits the deformation of said layers under traction.

The test specimen, once assembled, was brought to 150° C. under a pressure of 16 bar, for 30 minutes. Strips with a width of 30 mm were then cut out using a cutting machine. The two sides of the incipient crack were subsequently placed in the jaws of an Instron brand tensile testing machine. The tests were carried out at 20° C. and at a pull speed of 100 mm/min. The tensile stresses were recorded and the latter were standardized by the width of the test specimen. A curve of strength per unit of width (in N/mm) as a function of the movable crosshead displacement of the tensile testing machine (between 0 and 200 mm) was obtained. The adhesion value selected corresponds to the propagation of the crack within the test specimen and thus to the mean stabilized value of the curve. The adhesion values of the examples were standardized relative to a control (base 100). An index of greater than 100 indicates a greater improvement in adhesion.

The adhesion of compositions C1 to C6, in accordance with the invention, was compared with controls T1 to T6 not in accordance with the invention which differ respectively from compositions C1 to C6 only by the nature of the 1,3-diene: 1,3 diene of formula (I) for compositions C1 to C6 and 1,3-butadiene for compositions T1 to T6 (the elastomers E1 and E2 were prepared according to the process described in point IV.2 above).

The layer based on natural rubber on which the adhesion was tested corresponds to a composition conventionally used in the inner layer of a tyre, such as a carcass ply or a tread underlayer, comprising 100 phr of natural rubber.

The compositions tested (in phr), as well as the results obtained, are presented in Table 5.

TABLE 5

| Compositions | T1 | C1 | T2 | C2 | T3 | C3 | T4 | C4 | T5 | C5 | T6 | C6 |
|---|---|---|---|---|---|---|---|---|---|---|---|---|
| NR(1) | 60 | 60 | 80 | 80 | 20 | 20 | 40 | 40 | 60 | 60 | 80 | 80 |
| Elastomer E1 | 40 | — | 20 | — | 80 | — | 60 | — | 40 | — | 20 | — |
| Elastomer E2 | — | 40 | — | 20 | — | 80 | — | 60 | — | 40 | — | 20 |
| N234(2) | 40 | 40 | 40 | 40 | — | — | — | — | — | — | — | — |
| Silica(3) | — | — | — | — | 48 | 48 | 48 | 48 | 48 | 48 | 48 | 48 |
| Coupling agent(4) | — | — | — | — | 3.8 | 3.8 | 3.8 | 3.8 | 3.8 | 3.8 | 3.8 | 3.8 |
| DPG(5) | — | — | — | — | 1 | 1 | 1 | 1 | 1 | 1 | 1 | 1 |
| Antioxidant(6) | 2 | 2 | 2 | 2 | 2 | 2 | 2 | 2 | 2 | 2 | 2 | 2 |
| Anti-ozone wax(7) | 1 | 1 | 1 | 1 | 1 | 1 | 1 | 1 | 1 | 1 | 1 | 1 |
| Stearic acid | 1.5 | 1.5 | 1.5 | 1.5 | 1.5 | 1.5 | 1.5 | 1.5 | 1.5 | 1.5 | 1.5 | 1.5 |
| ZnO(8) | 2.5 | 2.5 | 2.5 | 2.5 | 2.5 | 2.5 | 2.5 | 2.5 | 2.5 | 2.5 | 2.5 | 2.5 |
| Accelerator(9) | 1.3 | 1.3 | 1.3 | 1.3 | 1.3 | 1.3 | 1.3 | 1.3 | 1.3 | 1.3 | 1.3 | 1.3 |
| Sulfur | 0.6 | 0.6 | 0.6 | 0.6 | 0.6 | 0.6 | 0.6 | 0.6 | 0.6 | 0.6 | 0.6 | 0.6 |
| Adhesion | 100 | 263 | 100 | 142 | 100 | 152 | 100 | 164 | 100 | 206 | 100 | 109 |

(1) NR: Natural rubber
(2) Carbon black N234 according to Standard ASTM D-1765-2017
(3) Silica, Zeosil 1165MP, sold by Solvay
(4) Liquid silane triethoxysilylpropyltetrasulfide (TESPT) Si69 from Evonik
(5) Diphenylguanidine, Perkacit DPG from Flexsys
(6) N-(1,3-Dimethylbutyl)-N-phenyl-para-phenylenediamine Santoflex 6-PPD from Flexsys
(7) Anti-ozone wax, Varazon 4959 from Sasol Wax
(8) Zinc oxide, industrial grade from Umicore
(9) N-Cyclohexyl-2-benzothiazolesulphenamide Santocure CBS from Flexsys These results show that the use of a rubber composition in accordance with the invention comprising a copolymer of ethylene and of 1,3-diene of formula (I) makes it possible to improve the adhesion on a diene composition compared to a rubber composition not in accordance with the invention comprising a copolymer of ethylene and of 1,3-diene.

The invention claimed is:

1. A rubber composition at least based on:
   5 to 95 phr of polyisoprene comprising a content by weight of 1,4-cis bonds of at least 90% of the weight of the polyisoprene;
   5 to 95 phr of copolymer of ethylene and of a 1,3-diene of formula (I), the ethylene units in the copolymer representing more than 50 mol % of the monomer units of the copolymer,

$$CH_2=CR-CH=CH_2 \qquad (I),$$

the symbol R representing a hydrocarbon chain having 3 to 20 carbon atoms; and
   a crosslinking system.

2. The rubber composition according to claim 1, wherein the copolymer contains ethylene units which represent between 50 mol % and 95 mol % of the monomer units of the copolymer.

3. The rubber composition according to claim 1, wherein the copolymer contains units of the 1,3-diene of 1,2 or 3,4 configuration which represent more than 50 mol % of the units of the 1,3-diene.

4. The rubber composition according to claim 1, wherein 1,3-diene is myrcene or β-farnesene.

5. The rubber composition according to claim 1, wherein the copolymer has a glass transition temperature below −35° C.

6. The rubber composition according to claim 1, wherein a content of the copolymer is within a range extending from 15 to less than 50 phr.

7. The rubber composition according to claim 1, wherein the polyisoprene comprises a content by weight of 1,4-cis bonds of at least 98% of the weight of the polyisoprene.

8. The rubber composition according to claim 1, wherein the polyisoprene is selected from the group consisting of natural rubber, synthetic polyisoprenes and mixtures thereof.

9. The rubber composition according to claim 1, wherein the copolymer has a glass transition temperature between −90° C. and −35° C.

10. The rubber composition according to claim 1, further comprising a reinforcing filler.

11. The rubber composition according to claim 10, wherein the reinforcing filler comprises mainly carbon black.

12. The rubber composition according to claim 10, wherein a content of reinforcing filler is within a range extending from 15 to 80 phr.

13. The rubber composition according to claim 1, wherein a content of the polyisoprene is within a range extending from more than 50 to 85 phr, and a content of the copolymer is within a range extending from 15 to less than 50 phr, and further comprising a reinforcing filler comprising mainly carbon black.

14. A tire comprising the rubber composition according to claim 1.

15. The tire according to claim 14, wherein the rubber composition is present in at least one sidewall of the tire.

* * * * *